United States Patent
Lenser et al.

(10) Patent No.: US 8,725,273 B2
(45) Date of Patent: May 13, 2014

(54) SITUATIONAL AWARENESS FOR TELEOPERATION OF A REMOTE VEHICLE

(75) Inventors: Scott Raymond Lenser, Waltham, MA (US); Mark Bourne Moseley, Woburn, MA (US)

(73) Assignee: iRobot Corporation, Bedford, MA (US)

( * ) Notice: Subject to any disclaimer, the term of this patent is extended or adjusted under 35 U.S.C. 154(b) by 432 days.

(21) Appl. No.: 13/030,120

(22) Filed: Feb. 17, 2011

(65) Prior Publication Data
US 2011/0264303 A1   Oct. 27, 2011

Related U.S. Application Data

(60) Provisional application No. 61/305,384, filed on Feb. 17, 2010.

(51) Int. Cl.
*G05B 19/18* (2006.01)
*G06F 19/00* (2011.01)

(52) U.S. Cl.
USPC ............... 700/2; 700/1; 700/245; 700/248; 700/250; 700/252

(58) Field of Classification Search
USPC ................. 700/1, 2, 245, 248, 250, 252
See application file for complete search history.

(56) References Cited

U.S. PATENT DOCUMENTS

| | | | | |
|---|---|---|---|---|
| 8,396,611 | B2 * | 3/2013 | Phillips et al. | 701/2 |
| 8,401,275 | B2 * | 3/2013 | Wang et al. | 382/153 |
| 8,532,823 | B2 * | 9/2013 | Mcelroy et al. | 700/259 |
| 8,577,517 | B2 * | 11/2013 | Phillips et al. | 701/2 |
| 8,594,844 | B1 * | 11/2013 | Gal | 700/246 |
| 2011/0264303 | A1 * | 10/2011 | Lenser et al. | 701/2 |
| 2013/0013108 | A1 * | 1/2013 | Jacobsen et al. | 700/250 |

OTHER PUBLICATIONS

Felzenszwalb, et al., "Efficient Graph-Based Image Segmentation", International Journal of Computer Vision 59(2), pp. 167-181, 2004.

* cited by examiner

*Primary Examiner* — Ian Jen
(74) *Attorney, Agent, or Firm* — Myers Bigel Sibley & Sajovec, P.A.

(57) ABSTRACT

A method for improving situational awareness for teleoperation of a remote vehicle by creating a 3D map display of an area around the remote vehicle comprises: receiving an original image from a stereo vision camera and utilizing the original image to perform visual odometry to determine the x, y, z, roll, pitch, and yaw for the original image; applying a fill-in algorithm to the original image to fill in an estimated depth for areas of the original image for which no depth data is available, which creates an enhanced depth image; combining the enhanced depth image with the x, y, z, roll, pitch, and yaw for the original image to create the 3D map display of the area around the remote vehicle; and displaying the 3D map display on an operator control unit used to control the remote vehicle.

17 Claims, 11 Drawing Sheets

SITUATIONAL AWARENESS FOR TELEOPERATION OF A REMOTE VEHICLE

This application claims the benefit of U.S. Provisional Application No. 61/305,384, filed Feb. 17, 2010.

This invention was made with government support under Contract No. N00164-05-DD647 awarded by the Department of the Navy and Cooperative Agreement No. N66001-08-2-0058 awarded by the department of the Navy. The government has certain rights in the invention.

The present teachings relate to a system and method for improving situational awareness for teleoperating a remote vehicle. The present teachings more particularly provide a situational awareness payload for a remote vehicle, and user interface modifications to an operator control unit. The operator control unit provides a 3D map display of the area around the remote vehicle constructed using stereo vision data, visual odometry, and heuristics to fill in depth data in areas that are lacking in texture.

BACKGROUND

Currently, Explosive Ordinance Disposal (EOD) and similar remote vehicle applications involve time-consuming and complex maneuvers that require the operator to expend significant cognitive attention in commanding and controlling the remote vehicle. In addition to controlling the remote vehicle, the operator has to consider the surroundings of the remote vehicle down range. This attention overload can leave the operator dangerously unaware of events in his own immediate environment.

Further, the operator is required to control every motion of the remote vehicle using limited sensory information and situational awareness, primarily provided by one or more video streams from independent monocular cameras. This required level of detailed control, coupled with a lack of situational awareness, can result in increased mission execution time. Increased mission execution time can cause increased time on target in areas of elevated risk to the operator and any supporting personnel.

SUMMARY

The present teachings provide a method for improving situational awareness for teleoperation of a remote vehicle by creating a 3D map display of an area around the remote vehicle, comprising: receiving an original image from a stereo vision camera and utilizing the original image to perform visual odometry to determine the x, y, z, roll, pitch, and yaw for the original image; applying a fill-in algorithm to the original image to fill in an estimated depth for areas of the original image for which no depth data is available, which creates an enhanced depth image; combining the enhanced depth image with the x, y, z, roll, pitch, and yaw for the original image to create the 3D map display of the area around the remote vehicle; and displaying the 3D map display on an operator control unit used to control the remote vehicle The present teachings also provide a system for providing improved situational awareness for teleoperation of a remote vehicle having a chassis, the system comprising: a remote vehicle having a range data payload and a computational payload, the computation payload providing a visual odometry map construction for a 3D image; and an operator control unit including a display screen displaying the 3D image of an area around the remote vehicle.

The present teachings further provide a system for providing improved situational awareness for teleoperation of a remote vehicle having a chassis, the system comprising: a remote vehicle having a range data payload and a computational payload, and a manipulator arm payload, the computation payload providing a visual odometry map construction for a 3D image; and an operator control unit including a display screen displaying the 3D image of an area around the remote vehicle, the 3D image being constructed from raw stereo vision data, visual odometry, fill-in algorithms, and plane fitting.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate several embodiments of the present teachings and together with the description, serve to explain the principles of the present teachings.

DESCRIPTION

Reference will now be made in detail to embodiments of the present teachings, examples of which are illustrated in the accompanying drawings.

The present teachings contemplate improving situational awareness and reducing time on target for missions such as EOD missions made by operators utilizing a remote vehicle such as a small unmanned ground vehicle, for example an iRobot® Packbot® and more specifically an iRobot® Packbot® MTRS EOD robot. The remote vehicle can be equipped with a situational awareness payload, the one or more components of which are explained in more detail below.

In accordance with certain embodiments of the present teachings, the proposed situational awareness payload is modular, and is capable of being connected to one or more existing payload ports of the remote vehicle, requiring minimal modifications to the base remote vehicle system.

The associated operator control unit can include appropriate user interface modifications to accommodate and display data received from the situational awareness payload. The user interface modifications can provide enhanced awareness by affording the operator a virtualized 3D view of the remote vehicle platform, an optional manipulator payload of the remote vehicle, and the local environment surrounding the remote vehicle. In addition to providing the operator with a detailed view of the remote vehicle and its spatial position within its environment, the user interface can facilitate command and control of the remote vehicle and its manipulator through a point-and-click-based interface with the displayed 3D remote vehicle and the 3D map of its environment. In certain embodiments of the present teachings wherein the operator can see the remote vehicle in its actual position on the OCU display screen, the operator may be able to direct the remote vehicle intuitively, seeing the onscreen model mimic the actions of its real world counterpart.

Figure 1:
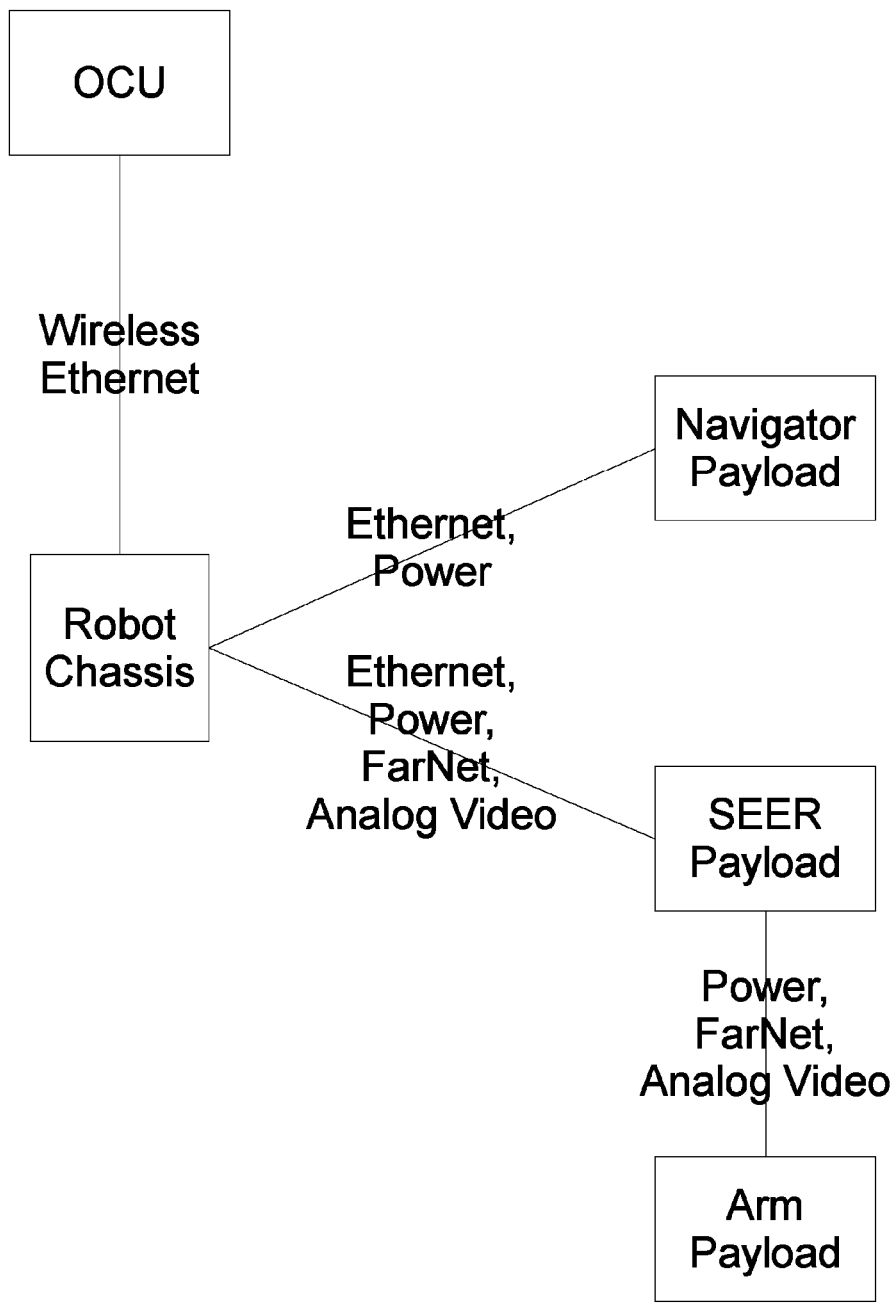
FIG. 1 is a schematic diagram of exemplary system architecture in accordance with the present teachings.
Figure 2A:
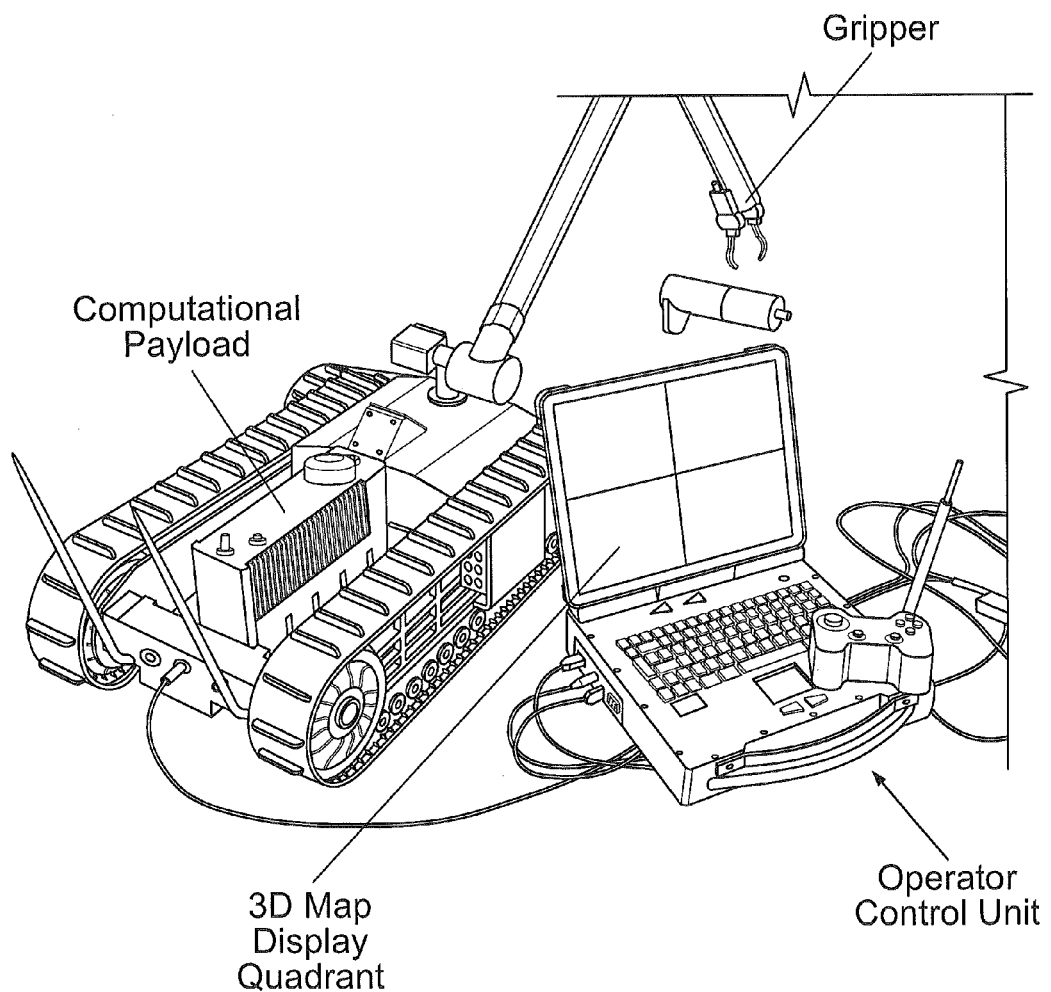
FIG. 2A illustrates an exemplary system in accordance with the present teachings, including a remote vehicle having payloads suitable for acquiring and processing data for use in accordance with the present teachings and an operator control unit for providing a 3D display in accordance with the present teachings.

FIG. 1 is a schematic diagram of exemplary system architecture in accordance with the present teachings. As can be seen, a remote vehicle chassis can have payloads such as a computational payload (e.g., a Navigator payload), a rnge data payload (e.g., a SEER stereo vision payload), and manipulator arm mounted thereon. A typical Navigator payload provides additional computation capabilities and sensors needed to process and interpret sensor data provided by the SEER payload. The Navigator payload is illustrated in FIG. 2C and can comprise, for example, a computer, for example an Intel Core Duo 1.2 GHz processor, 1 GB of RAM, and an 8 GB solid state flash memory hard drive, a six-axis microelectro-mechanical system (MEMS) inertial measurement unit (IMU) (e.g., a Microstrain 3DM-GX1), and optionally a GPS receiver (e.g., a Ublox Antaris 4 GPS receiver) and a magnetometer. The GPS receiver can typically determine the remote vehicle's position accurately to within approximately 2-4 meters. The IMU can typically determine the orientation of the remote vehicle and can have a drift rate of less than 1 per minute. The GPS and IMU therefore provide information regarding where the robot is in its environment. As will be understood by those skilled in the art, reference herein to a Navigator payload includes other payloads having the same or substantially the same components and/or capabilities.

Figure 2B:
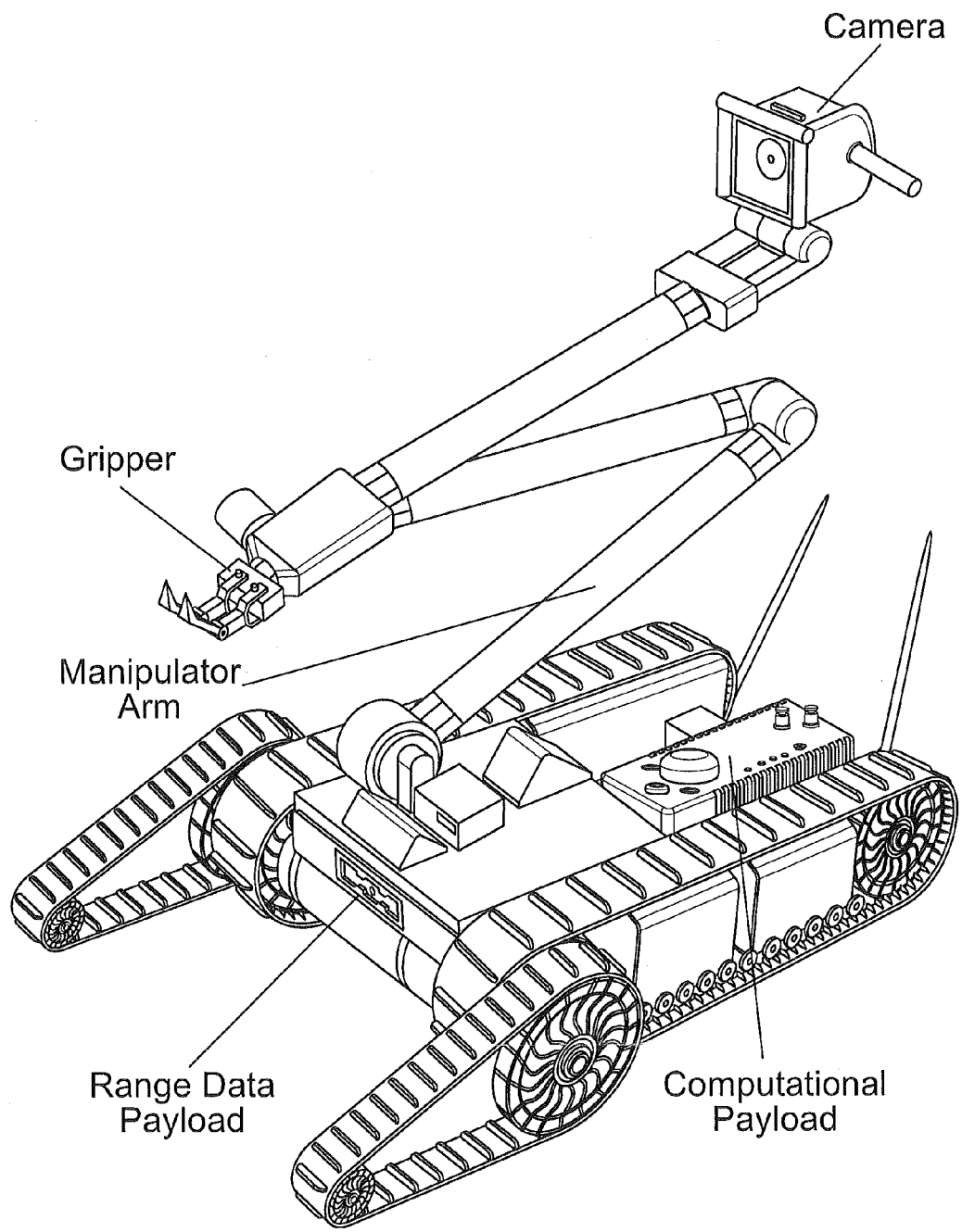
FIG. 2B illustrates an exemplary remote vehicle having payloads suitable for acquiring and processing data for use in accordance with the present teachings.
Figure 2C:
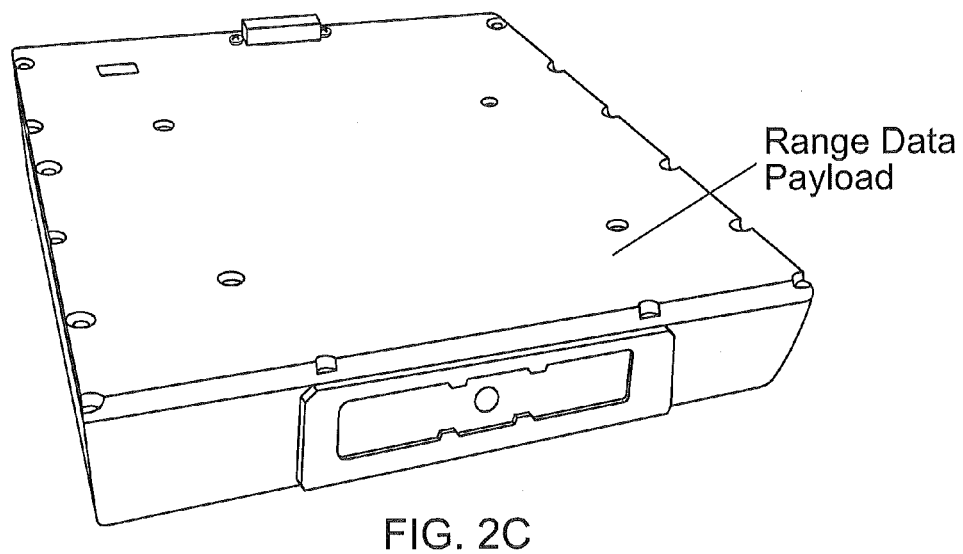
FIG. 2C illustrates an exemplary range data payload for use in accordance with the present teachings.
Figure 2D:
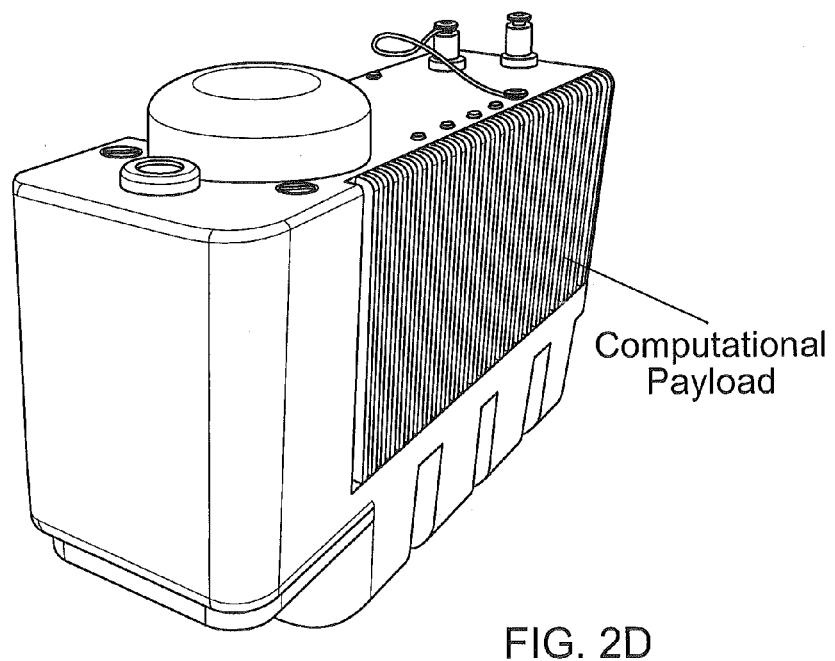
FIG. 2D illustrates an exemplary computational payload for use in accordance with the present teachings.

A typical SEER payload is illustrated in FIG. 2B and provides ranging data that can be used to provide the operator with an improved understanding of the spatial layout of the environment immediately around the remote vehicle, and can comprises a stereo vision camera, a stereo depth comparison chip, and a small processor that can be used to package and send data. The stereo vision camera can be, for example, mounted under the manipulator arm or otherwise mounted to obtain an unobstructed view of the remote vehicle's environment, and can provide, for example, 500×312 high-resolution 3D range data at 30 frames per second with a maximum range of 50 meters and with a range accuracy of 0-3% over a range of 0-5 meters. As will be understood by those skilled in the art, reference herein to a SEER payload includes other payloads having the same or substantially the same components and/or capabilities.

The manipulator arm payload can comprise, for example, a gripper arm payload having a gripper and a camera mounted thereon and trainable on the gripper. As will be understood by those skilled in the art, a situational awareness payload can comprise one or more payloads having the necessary components and/or capabilities available in the above-described Navigator and SEER payloads, and can optionally include a manipulator arm payload. The manipulator arm can be provided as part of the situational awareness payload, as a separate payload, or may not be provided on the remote vehicle.

An exemplary system in accordance with the present teaching is illustrated in FIG. 2A to comprise a small unmanned ground vehicle (i.e., an iRobot® Packbot®) including a computation payload (i.e., a Navigator payload), a range data payload (not shown), and a manipulator arm shown to have a gripper thereon, and an operator control unit comprising a display screen with a 3D map display in one of its quadrants.

An exemplary embodiment of a remote vehicle having the above-listed payload components and capabilities is illustrated in FIG. 2B. As shown in FIG. 1, the remote vehicle can communicate with the attached payloads via, for example, an Ethernet connection. As will be readily understood, other known methods of communication can additionally or alternatively be employed. The remote vehicle chassis can include a power supply such as, for example, one or more batteries or fuel cells, and can provide power for each of the payloads. Alternatively, some or all of the payloads can include their own power supply such as a battery or fuel cell.

In the embodiment of FIG. 1, the remote vehicle chassis communicates with the Navigator payload via Ethernet and provides power to the Navigator payload. The chassis also communicates with the SEER payload via Ethernet and provides power to the SEER payload. In addition, in the illustrated embodiment wherein the manipulator arm payload plugs into the SEER payload, the chassis provides power to the manipulator arm payload via the SEER payload. Further, analog video from a camera on the manipulator arm can be passed to the chassis via the SEER payload, and a proprietary protocol for providing operator instructions to the manipulator arm payload, such as FarNet, can be passed to the manipulator arm via instructions sent from the operator control unit to the remote vehicle chassis and from the remote vehicle chassis to the manipulator arm payload via the SEER payload.

In accordance with various embodiments, a JAUS 3.4 compatible messaging capability can be provided for communications between the OCU and the payloads. The messages can, for example, communicate range data from the remote vehicle to the OCU and remote vehicle motion data from the remote vehicle's visual odometry system to the OCU.

In accordance with certain embodiments of the present teachings, an analog camera can be added to the SEER payload or otherwise on the remote vehicle and provide additional visual data for the OCU display, and therefore another analog video line may run to the remote vehicle chassis for the additional camera, for example from the SEER payload.

In certain embodiments, the situational awareness payload and/or its component payloads, for example the Navigator payload, attaches to one or more modular payload bays on the remote vehicle in a plug-and-play fashion, without requiring modification to the remote vehicle hardware or software. Similar to the Navigator payload, the SEER payload can attach to one or more modular payload bays on the remote vehicle in a plug-and-play fashion, without requiring modification to the remote vehicle hardware or software. As set forth above, in certain embodiments of the present teachings, the manipulator arm payload can plug into the SEER payload in a plug-and-play fashion, without requiring modification to the remote vehicle hardware or software.

The system architecture illustrated in FIG. 1 also includes an operator control unit (OCU). The OCU can communicate with the remote vehicle chassis via, for example, wireless Ethernet to send commands to the remote vehicle and receive data from the remote vehicle.

The present teachings contemplate providing 3D data in the form of raw stereo data from a stereo vision camera as a panel the OCU. The stereo vision camera is part of the stereo data payload and can comprise, for example, a Tyzx stereo vision camera or other suitable camera providing stereo data. The minimum range of some stereo vision cameras may be too far for the ideal work environment for the remote vehicle's arm. To compensate for minimum range issues, the stereo vision camera can be run in a different mode that trades reduced minimum range for reduced range accuracy in a manner known to those skilled in the art. Such a reduced-range mode can, in certain embodiments, be selected dynamically, allowing the user to dynamically choose between improved minimum range and improved distance accuracy. Alternatively, the present teachings contemplate modifying a baseline of the stereo vision camera to reduce the minimum range in a manner known to those skilled in the art, which can also reduce the range accuracy.

The raw stereo data can be converted to a 3D map display by constructing a virtual view of the 3D data directly from the stereo vision camera as a panel on the OCU to create an intuitive display of the stereo vision data useful to operators performing tasks with the remote vehicle. Bandwidth between the remote vehicle and the OCU can constrain the amount of data passed therebetween; however, the perceived quality of the display can depend on the resolution of the 3D reconstruction, particularly with regard to texture. Rendering speed for a high-quality display can also be problematic given the number of polygons and textures involved in a high-quality display.

The present teachings contemplate providing map construction for the 3D image on a computational payload of the remote vehicle, thus minimizing the amount of data sent to the OCU. Data is processed in the computational payload and then sent to the OCU. Communication between the payload and the OCU can be used to send processed map update data, for example at about 1 Hz using about 500 Kbps. Combined with the two video streams typically sent from the remote vehicle to the OCU, the remote vehicle therefore may utilize, for example, about 1.25 Mbps of bandwidth.

In certain embodiments of the present teachings, the 3D map display can be implemented as a new display quadrant option on an existing OCU screen, and provide an integrated view of the remote vehicle's current pose, including flipper and arm positions if applicable, as well as a spatial representation of obstacles around the remote vehicle. In various embodiments, the spatial representation can be colorized. The integrated 3D display can greatly improve an operator's situational awareness and enable a faster tempo of operations. In certain embodiments of the present teachings, the display quadrant can be selected for viewing by the operator, and can be quickly shown or hidden depending on an operator's immediate need. Certain embodiments of the present teachings contemplate the additional display quadrant being a supplemental alternative to, rather than a replacement for, current views provided by existing remote vehicle OCUs. Thus, impact to existing operator's can be minimized because current OCU view(s) will still be available.

The new display quadrant can comprise a virtualized overhead view of the remote vehicle, showing the position of the remote vehicle and its manipulator arm, and the remote vehicle's position with respect to obstacles in the local environment. The virtualized view of the remote vehicle can be positioned on the OCU screen, for example, below a primary video feed from a camera located at the end of the manipulator arm, to maximize the correlation between the virtualized viewpoint and the actual view supplied by an analog video camera mounted on the manipulator arm.

As stated above, the present teachings contemplate structuring the 3D map display so that it is directly below the view returned by the primary video feed from a camera located at the end of the manipulator arm. The present teachings also contemplate the primary video feed and the 3D map display being linked together so they always point in the same direction. However, certain embodiments contemplate the primary video feed and the 3D map display pointing in independent directions. Although having the primary video feed and the 3D map display point in independent directions may make it difficult for a user to reconcile what he or she is seeing on the OCU screen when controlling the remote vehicle, linking the views might make it harder for the user to drive forward.

The local obstacle map for the 3D map display of the OCU can be iteratively constructed using range data provided by the stereo vision camera combined with odometry information. The range data can be displayed using a 3D representation that allows the operator to assess the height of objects in the environment in order to make navigation decisions. The present teachings thus contemplate providing color coding to the display based on height above the ground, which can simplify user interpretation of the displayed 3D map. Objects that present navigation obstacles can, for example, be rendered in red to alert the operator to their presence and the potential collision hazard. The present teachings also contemplate color coding based on distance from the remote vehicle, but color coding for height is preferable. This at-a-glance depiction of the surroundings can enable faster and safer teleoperation of the remote vehicle.

The present teachings contemplate providing a depth feedback option for the 3D map display, as well as the ability to measure distances via selection on the 3D map display. The display is preferably updated live.

Visual odometry can be utilized in a system of the present teachings for rendering of the 3D map display, providing the x, y, z, roll, pitch, and yaw for images retrieved from the stereo vision camera so that the images can be accurately added to the 3D map display. Visual odometry can also be used when creating a virtual remote vehicle for display in accordance with the present teachings. Visual odometry is the process of determining the position and orientation of a vehicle by analyzing associated camera images. An advantage of visual odometry is that it provides an odometry reading based on a wide area of coverage around the remote vehicle due to memory of areas currently out of view of the stereo vision cameras used therefor. Visual odometry can be integrated into the map construction and thus, for example, can be installed on the computational payload. Because visual odometry can drift while a vehicle is stationary and therefore cause a tilted or otherwise inaccurate map, the present teachings contemplate allowing the user to reset the map when such drift is detected or after the vehicle has been stationary for an extended period of time.

Visual odometry algorithms can estimate a six-dimensional position (x, y, z, roll, pitch, and yaw) of the remote vehicle from its initial starting position using an Iterative Closest Point (ICP) and Random Sample Consensus (RANSAC)—based algorithm. A current exemplary algorithm can extract key features from a frame, for example approximately 100-500 features, and compare them to a reference frame. Matches between the points of the two frames are then used to estimate a 4×4 affine matrix transformation needed to align the two sets of features.

To prevent unwarranted drift, frames with motion beneath a certain threshold may not affect the cumulative odometry. Similarly, if large amount of bad matches occur and the estimated motion is larger than the maximum possible motion of the remote vehicle, the frame can be ignored. Such a case can often occur, for example, if large objects, such as a person, move through the camera's field of view.

Overall, a visual odometry algorithm can produce odometry comparable to tracked odometry. Unlike typical encoder odometry, visual odometry may not be skewed by the slippage that frequently occurs. This can be particularly evident during turning, where tracked odometry has been shown to produce errors of up to +−90 degrees in a 180 degree turn. The visual odometry algorithm can also provide complete six-dimensional odometry: x, y, z, roll, pitch, and yaw, whereas tracked odometry provides only x, y, and yaw.

Figure 3:
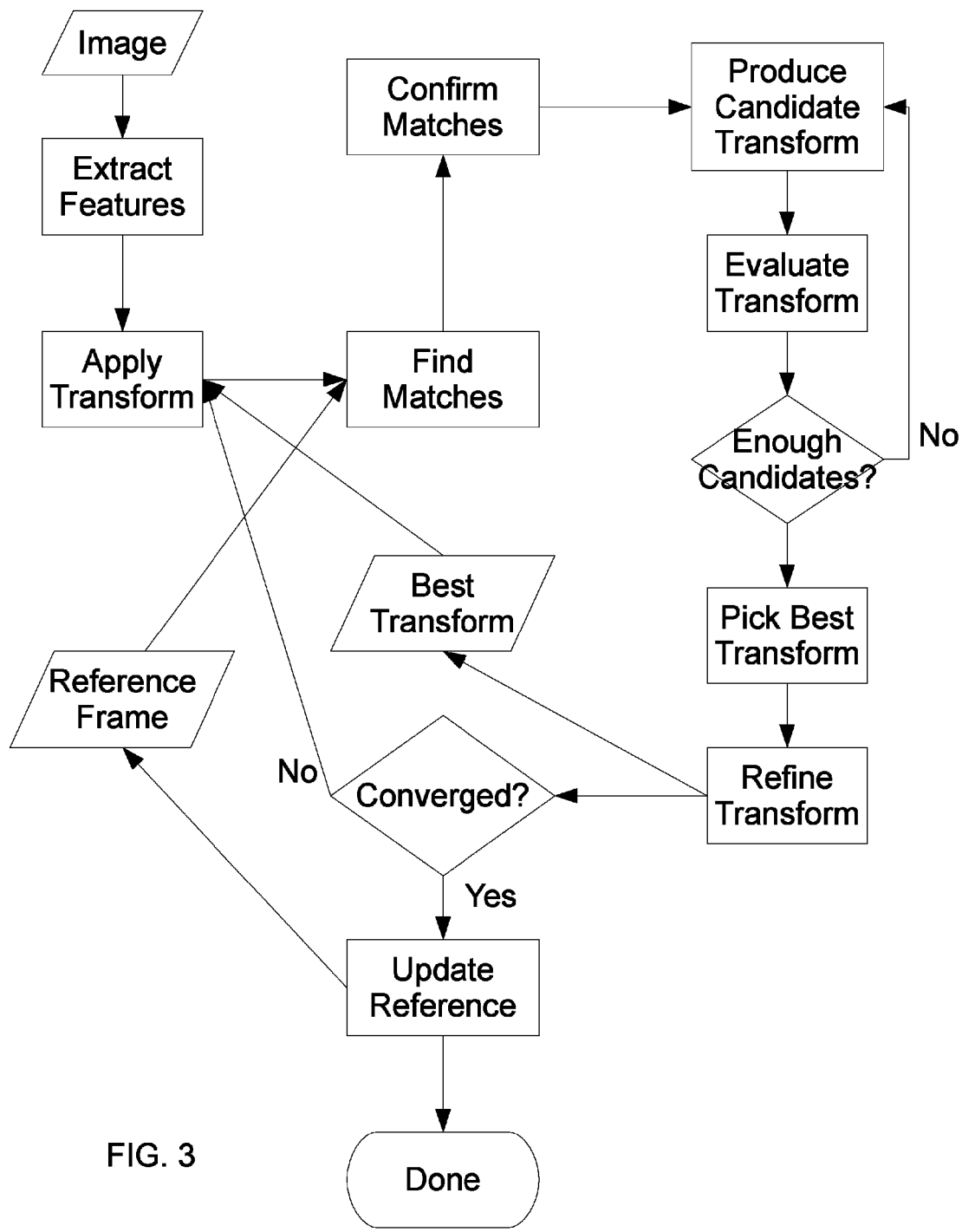
FIG. 3 is a flow chart setting forth an exemplary visual odometry routine.

A flow chart setting forth an exemplary visual odometry routine is shown in FIG. 3. The algorithm takes three points from the stereo vision camera data and fits the points into a map of the environment or a "scene". As shown, the visual odometry routine extracts features from the image and applies a transform. Thereafter, the algorithm finds matches from the scene and confirms them. Confirmation of the matches can include taking the image patch around the point and cross-correlating it. If the cross-correlation is high enough and there is a mutual consistency, the matches are confirmed. A candidate transform is them produced by picking a number of the matched pairs, allowing a translation to be determined in x, y, z, roll, pitch, and yaw. The candidate transform is then evaluated to determine whether it corresponds with other matches from the scene (e.g., how many and how well they match), and the algorithm determines whether enough candidates have been confirmed. If so, a best transform is selected. If not, more candidates are processed as described above. Once the best transform has been selected, the transform can be refined by running a standard minimization scheme. Once the refining step converges (or after a predetermined amount of time or iterations), a reference frame is updated and stored, and the algorithm is finished with its current iteration. In addition, after the transform has been refined, it is stored as a best transform and used in subsequent "apply transform" steps.

Holes in the stereo vision data can be an obstacle to the operator's intuitive understanding of the 3D map display, and thus limit the ability of the system to provide improved situational awareness. Missing stereo vision data can result in empty, see-through areas of the 3D map display that misrepresent the existing solid objects in the environment. The present teachings contemplate intelligently interpolating depth across the image constructed from the stereo vision data in an effort to fill in or guess at the correct depth for areas having no available stereo vision data (e.g., for areas lacking surface texture sufficient for detection by the stereo vision cameras based on the resolution and range of the camera and lighting conditions).

In accordance with certain embodiments of the present teachings, heuristics can be used to fill in depth (and hence 3D map) data for areas that are lacking in texture. Simple heuristics can look for areas with no visual texture that had depth information on both sides at roughly consistent depths. The depths between the sides of consistent depth are filled in by interpolating between the known depths at the sides, providing a more accurate 3D map display.

Building on the simple heuristic above, certain embodiments of the present teachings contemplate filling in data missing from the stereo vision camera. Data fill-in can be accomplished, for example, by segmenting the image, fitting planes to the depth data within each region, and then using the planes to estimate depth where stereo data is missing. Segmentation using even an off-the-shelf algorithm (e.g., Efficient Graph-Based Image Segmentation, Pedro F. Felzenszwalb and Daniel P. Huttenlocher, International Journal of Computer Vision, Volume 59, Number 2, September 2004) can result in improved 3D map display results; however, an algorithm can be adjusted or created to improve the amount of data availability for the plane fitting step. The present teachings contemplate allowing the user to turn the fill-in feature on and off as desired.

Figure 4:
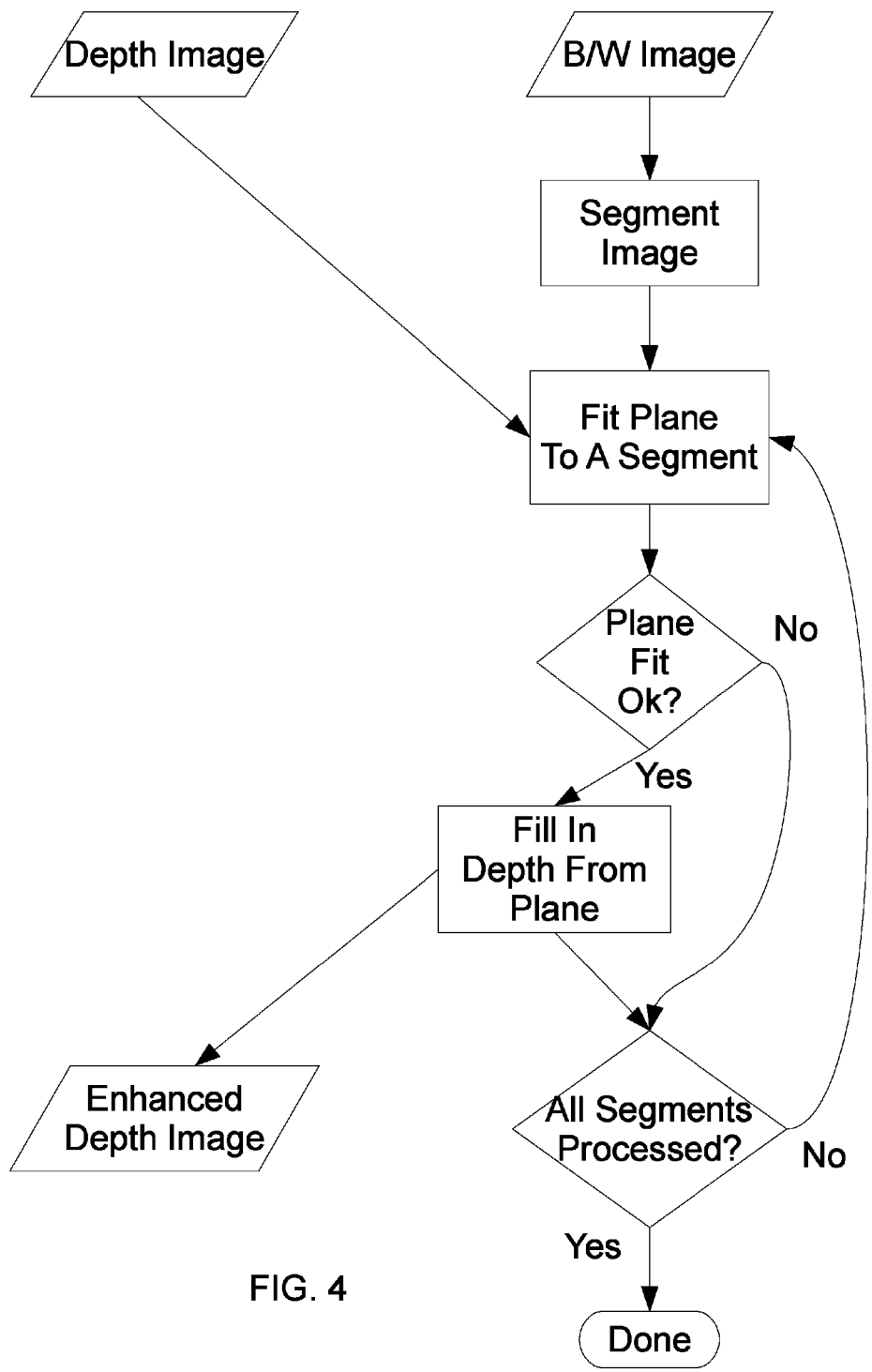
FIG. 4 is a flow chart setting forth an exemplary embodiment of a fill-in algorithm.

A schematic diagram of an exemplary embodiment of a fill-in algorithm is illustrated in FIG. 4. As shown, an image from the stereo vision camera is segmented and a plane is fit to the image segment as shown, for example, in FIG. 5 (discussed below). A depth image is used as input to the plane fitting step. In accordance with certain embodiments of the present teachings, the segmented image includes the image and a list of the segment that each pixel belongs to, including depth. If the plane fitting step is successful, the algorithm fills in image depth from the plane, stores the depth image, and determines whether all of the image segments have been processed. If not, the next segment is plane fitted and processed as described above. The image segmenting algorithm knows how many segments it produced, and the algorithm loops through the segments, for example by size, until there are no remaining segments from the image. Once all of the segments of an image have been process by the fill-in algorithm, the originally-input image is finished and the next image is segmented and processed accordingly. In certain embodiments, all of the image segments may not be processed, which can save processing time. The output of the fill-in algorithm is an enhanced depth image that can be combined with the visual odometry data and projected into the 3D map display for a more robust representation of the remote vehicle's environment.

Figure 5:
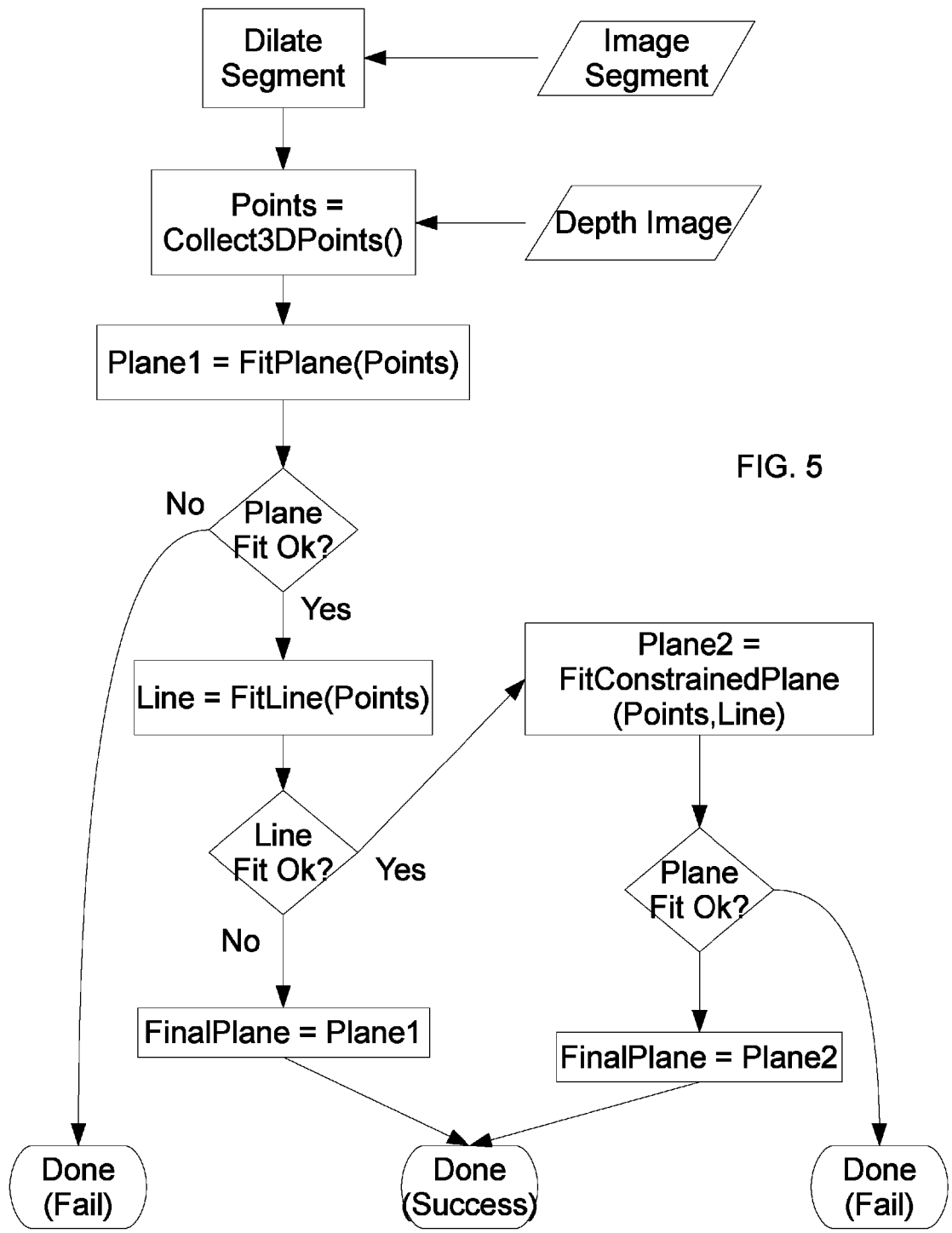
FIG. 5 is a flow chart setting forth an exemplary embodiment of a plane fitting algorithm for the fill-in algorithm of FIG. 4.

FIG. 5 illustrates a schematic diagram of an exemplary embodiment of a plane-fitting algorithm for use in the fill-in algorithm of FIG. 4. As shown, an image segment is dilated (e.g., taking a binary region of the image segment and dilating it horizontally) and then the dilated image segment and a depth image are used to determine location relative to the stereo vision camera and collect 3D points. Thereafter, a Random Sample Consensus (RANSAC)-based algorithm can be used to fit a plane to the points. The fit of the plane to the points is then checked (based, for example, on the number of points that are sufficiently close the plane). If the plane fit is not okay, the system is done and has failed. If the plane fit is okay, the algorithm tries to fit a line to the points. If a line can be fit to the points (i.e., if the line fit is okay), the plane is replaced by a constrained plane and plane fit is checked again. If the second plane fit is not okay, the system is done and has failed. If the second plane fit is okay, the final plane is the second plane and the system is finished plane fitting for that segment. If a line could not be fit to the points of the first plane, the final plane is the first plane and the system is finished plane fitting for that segment.

Figure 6A:
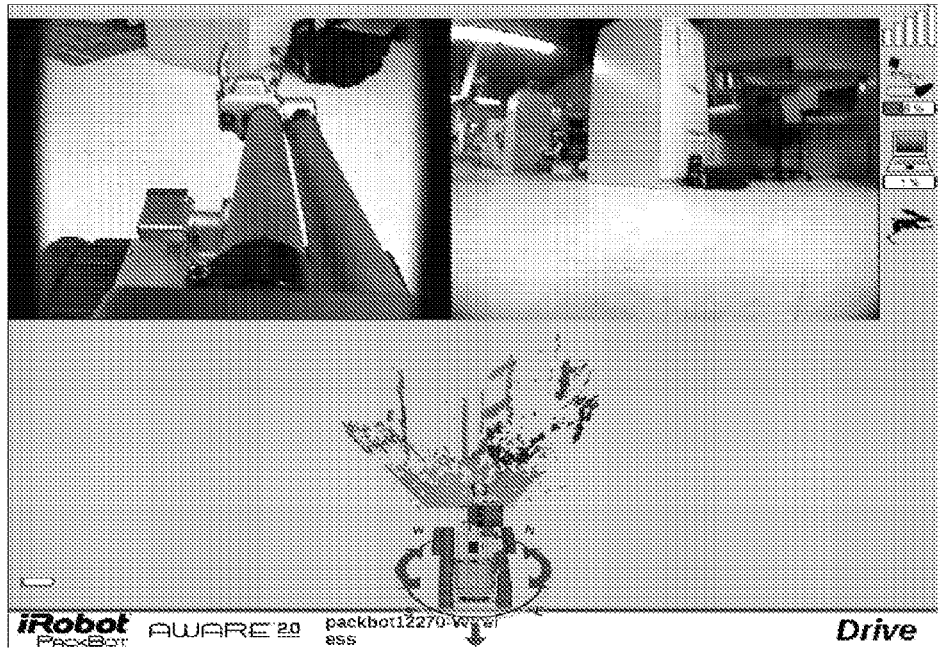
FIGS. 6A, 7A, 8A, and 9A illustrate an operator control unit screen with an exemplary embodiment of a 3D map display created in accordance with the present teachings, using raw stereo vision camera data.
Figure 6B:
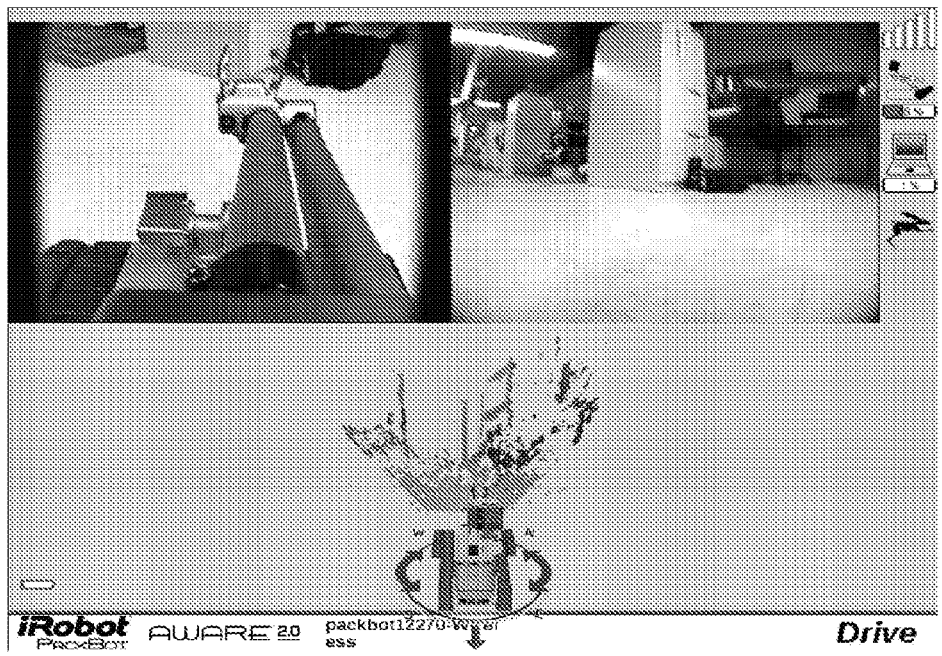
FIGS. 6B, 7B, 8B, and 9B illustrate an operator control unit screen with an exemplary embodiment of a 3D map display created in accordance with the present teachings, using stereo vision camera data in combination with visual odometry, fill in algorithms, and plane fitting.
Figure 7A:
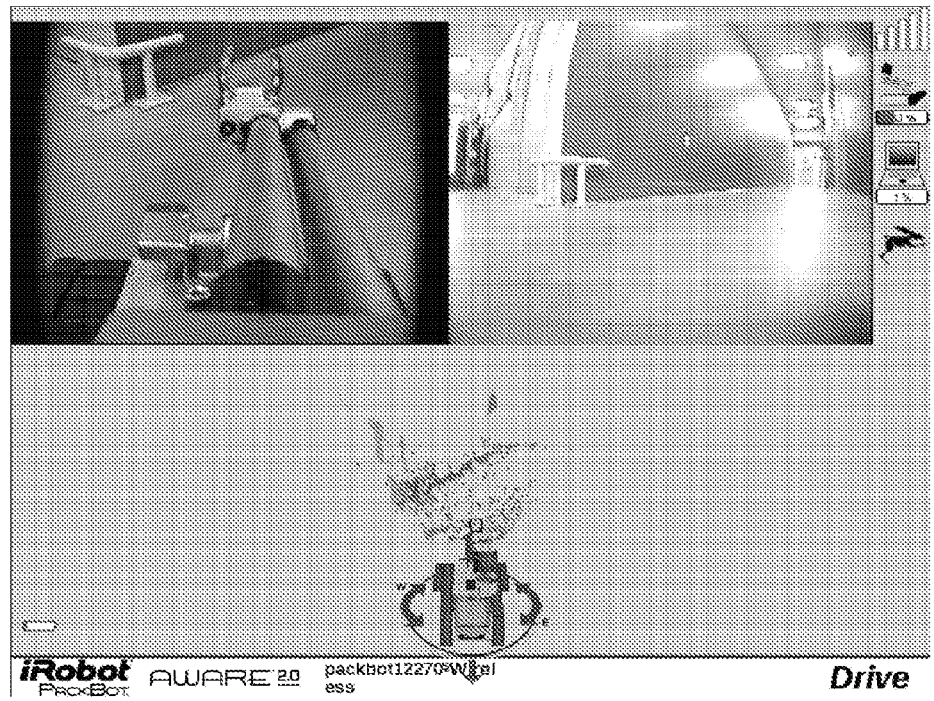
Figure 7B:
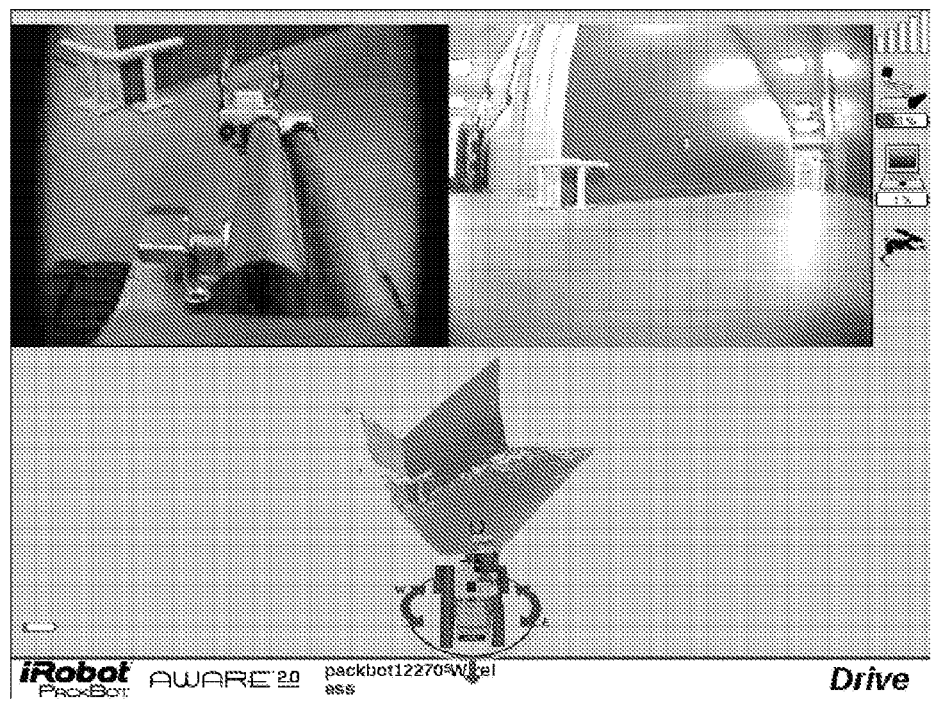
Figure 8A:
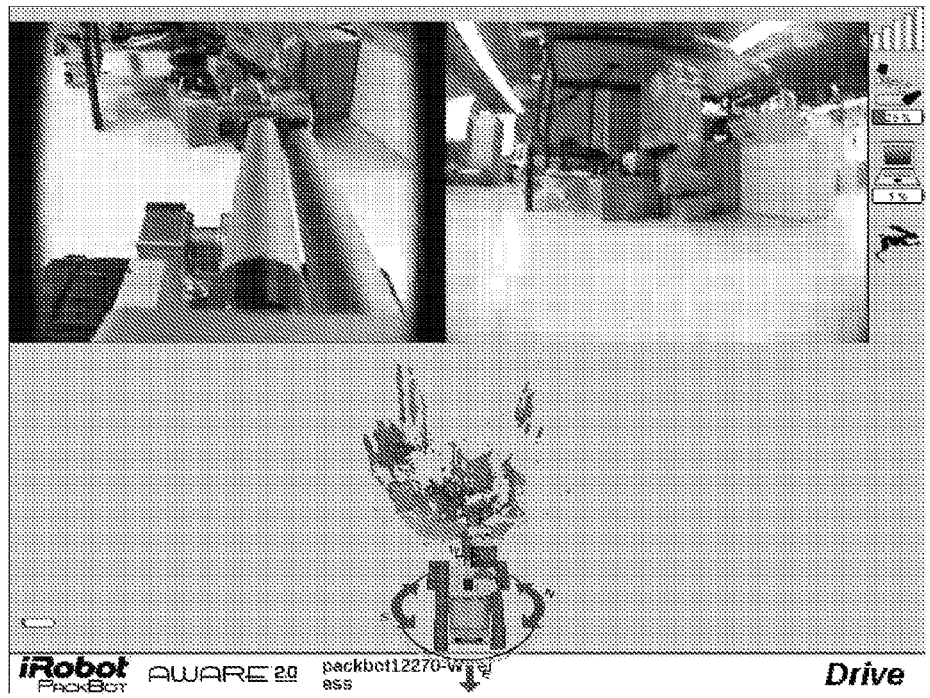
Figure 8B:
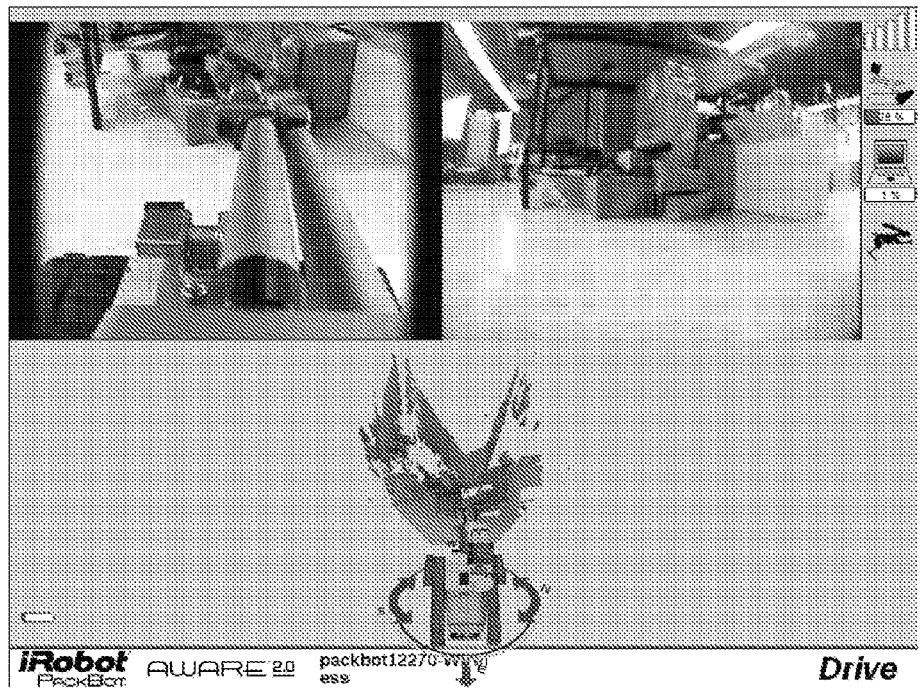
Figure 9A:
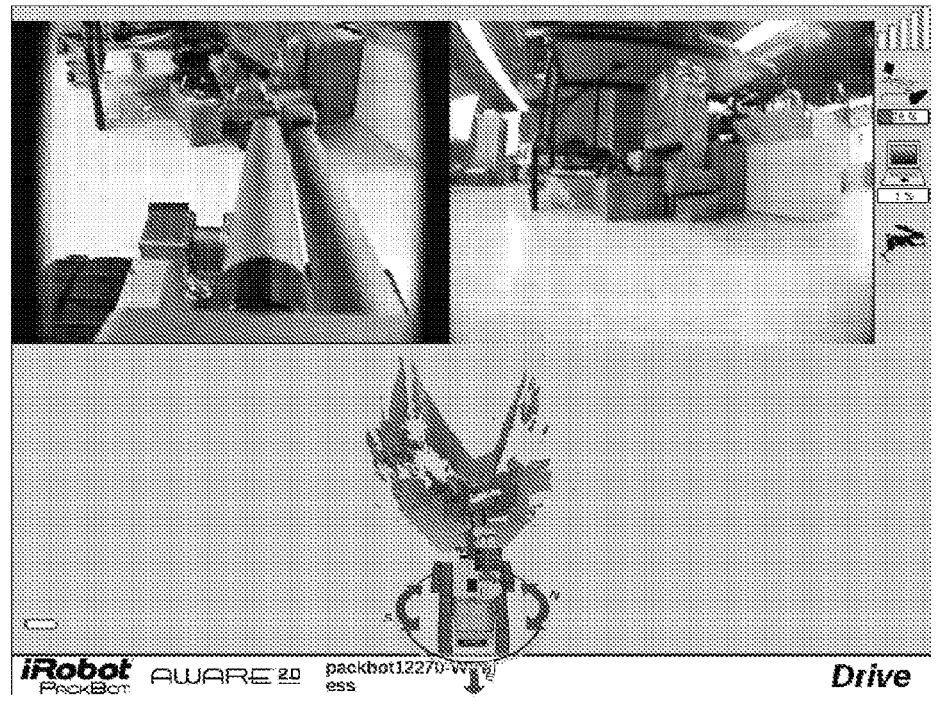
Figure 9B:
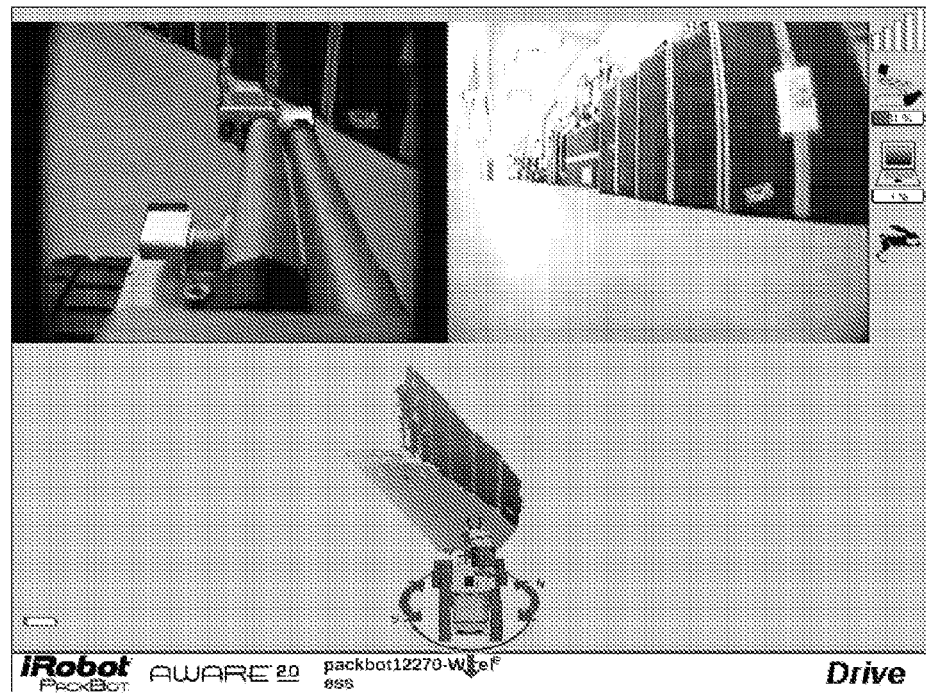

Exemplary versions of 3D map displays created in accordance with the present teachings are shown in FIGS. 6A, 6B, 7A, 7B, 8A, 8B, 9A, and 9B. FIGS. 6A, 7A, 8A, and 9A illustrate an exemplary 3D map display including only raw stereo vision data. FIGS. 6B, 7B, 8B, and 9B illustrate a preferred exemplary 3D map display created using stereo vision data in combination with visual odometry, a fill-in algorithm, and plane fitting. As will be appreciated, FIGS. 6A, 6B, 7A, 7B, 8A, 8B, 9A, and 9B do not adequately identify any color coding that may be added to the 3D map display. The differences between the "A" figures and the "B" figures show an exemplary amount of improvement to the 3D map display that can be achieved by combining the raw stereo vision data with visual odometry, a fill-in algorithm, and plane fitting. FIGS. 6A and 6B show a video feed of a room with a cabinet, and the associated 3D map display thereof. FIGS. 7A and 7B show a video feed of a hallway, and the associated 3D map display thereof. FIGS. 8A and 8B show a video feed of a storage area with clutter, and the associated 3D map display thereof. FIGS. 9A and 9B show a video feed of a room with a line of crates, and the associated 3D map display thereof.

As shown in the 3D map display of FIGS. 6A, 6B, 7A, 7B, 8A, 8B, 9A, and 9B, the 3D map display can include a 3D image of the remote vehicle indicating its position within its environment. In certain embodiments of the present teachings including such a 3D remote vehicle image, the image may indicate the exact pose of the remote vehicle and the position of, for example, an attached gripper arm or camera.

In various embodiments, the displayed 3D image of the remote vehicle is manipulable by the operator to change the position of the remote vehicle and thus provide a 3D map display for another portion of the remote vehicle's environment. The operator can use the 3D map display to send motion commands to the remote vehicle via intuitive, simple, click and drag operations. For example, in the embodiment of FIG. 6B, the OCU can include a user interface allowing the operator to drive the remote vehicle by clicking on one of the arrows surrounding the remote vehicle, which can cause the remote vehicle to move in a direction indicated by the arrow. For example, the operator can click on the curved arrows to the right and left of the remote vehicle to pivot the remote vehicle and pan its surroundings. The operator can also click on the arrows to the front and rear of the remote vehicle to drive the remote vehicle forward and backward, respectively. Movement of the remote vehicle within its environment changes the video feed and the 3D display to represent its changing environment.

Using range data provided by the range data payload, the present teachings contemplate providing a point-and-click-based control mechanism for positioning the remote vehicle and its manipulator arm. The operator can, for example, use an obstacle map built from the stereo vision data to identify navigable paths around the remote vehicle, and then direct the remote vehicle along a desired path through a point and click-based interface by clicking on various waypoints designating the desired path, causing the remote vehicle to execute the motions required to traverse that path. This can greatly simplify operator cognitive load, as compared with current methods of micro-directing remote vehicle movement, particularly along a tortuous or obstructed path.

In certain embodiments of the present teachings, the same or a similar point-and-click-based interface can be used to control the manipulator arm and its end effector. The 3D map display can allow the operator to see a three-dimensional representation of the remote vehicle's environment and the objects in it, allowing the operator to specify where the manipulator arm should be positioned to accomplish the task at hand. The operator can click on the manipulator arm on the 3D map display and drag it to a desired pose or position, and the remote vehicle can execute the motions required to achieve the desired pose or position.

In certain embodiments of the present teachings, the operator can additionally or alternatively pan and tilt the virtualized view using an OCU hand controller, for example a joystick on the OCU's hand controller (see FIG. 2A). In accordance with certain embodiments, rotating the view of the 3D map display allows the operator to see, for example, a 3D view of what is behind or to the side of the remote vehicle, based on data collected during a previous traversal of the remote vehicle through its environment. Although the remote vehicle's camera(s) may not be pointed rearward and, in effect, the remote vehicle no longer directly "sees" its environment to the side and rear, the stereo vision camera data information can be integrated into a local consistent map, allowing the operator to evaluate the environment behind the remote vehicle. This real-world situational view can be useful when operators need to operate a remote vehicle in reverse or perform motions in cluttered environments while avoiding potential collisions with surrounding objects or obstacles.

Integrating positioning information provided by visual odometry with data from the IMU can provide an accurate position estimate for the remote vehicle as it moves, allowing the system to use the stereo vision data to build an accurate and persistent local map of obstacles surrounding the remote vehicle. Even when obstacles are no longer shown in a virtualized teleoperation view of the OCU (for example, after the remote vehicle has passed them and they are behind the remote vehicle), their presence can be remembered by a computer of the situational awareness system, enabling the operator to draw upon that knowledge as required.

In accordance with certain embodiments of the present teachings, particularly those implemented on an iRobot® PackBot®, system software running on the payloads can be written within iRobot's Aware™ 2.0 Robot Intelligence Software.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for improving situational awareness for teleoperation of a remote vehicle by creating a 3D map display of an area around the remote vehicle, the method comprising:
   receiving an original image from a stereo vision camera and utilizing the original image to perform visual odometry to determine the x, y, z, roll, pitch, and yaw for the original image;
   applying a fill-in algorithm to the original image to fill in an estimated depth for areas of the original image for which no depth data is available, which creates an enhanced depth image;
   combining the enhanced depth image with the x, y, z, roll, pitch, and yaw for the original image to create the 3D map display of the area around the remote vehicle; and
   displaying the 3D map display on an operator control unit used to control the remote vehicle.

2. The method of claim 1, further comprising displaying the 3D map and a primary video feed adjacent each other.

3. The method of claim 2, further comprising allowing the operator to turn the 3D map display on and off.

4. The method of claim 3, further comprising displaying the 3D map display as a supplemental operator display choice rather than replacing an existing operator display choice.

5. A system for providing improved situational awareness for teleoperation of a remote vehicle having a chassis, the system comprising:
- a remote vehicle having a range data payload and a computational payload, the computation payload providing a visual odometry map construction for a 3D image; and
- an operator control unit including a display screen displaying the 3D image of an area around the remote vehicle.

6. The system of claim 5, wherein the 3D image is constructed from raw stereo vision data.

7. The system of claim 5, wherein the 3D image is constructed from raw stereo vision data, visual odometry, fill-in algorithms, and plane fitting.

8. The system of claim 5, wherein the range data payload comprises a SEER payload.

9. The system of claim 8, wherein the computation payload comprises a Navigator payload.

10. The system of claim 9, further comprising a manipulator arm payload.

11. The system of claim 10, wherein the remote vehicle chassis communicates with the Navigator payload via Ethernet and provides power to the Navigator payload,
- wherein the remote vehicle chassis also communicates with the SEER payload via Ethernet and provides power to the SEER payload, and
- wherein the manipulator arm payload plugs into the SEER payload and the remote vehicle chassis provides power to the manipulator arm payload via the SEER payload.

12. The system of claim 11, wherein the manipulator arm comprises a camera, and analog video from the camera is passed to the chassis via the SEER payload.

13. The system of claim 12, wherein operator instructions for the manipulator arm payload are passed to the manipulator arm payload via instructions sent from the operator control unit to the remote vehicle chassis and from the remote vehicle chassis to the manipulator arm payload via the SEER payload.

14. The system of claim 10, wherein the Navigator payload attaches to a payload bay on the remote vehicle in a plug-and-play fashion, the SEER payload attaches to a payload bay on the remote vehicle in a plug-and-play fashion, and the manipulator arm payload plugs into the SEER payload in a plug-and-play fashion.

15. A system for providing improved situational awareness for teleoperation of a remote vehicle having a chassis, the system comprising:
- a remote vehicle having a range data payload and a computational payload, and a manipulator arm payload, the computation payload providing a visual odometry map construction for a 3D image; and
- an operator control unit including a display screen displaying the 3D image of an area around the remote vehicle, the 3D image being constructed from raw stereo vision data, visual odometry, fill-in algorithms, and plane fitting.

16. The system of claim 15, wherein, in the plane fitting algorithm:
- an image from the stereo vision camera is segmented and a plane is fit to the image segment;
- a depth image is used as input to the plane fitting step;
- the segmented image includes the image and a list of the segment that each pixel belongs to, including depth;
- the algorithm fills in image depth from the plane if the plane fitting step is successful, stores the depth image, and determines whether all of the image segments have been processed the next segment is plane fitted and processed as described above if the plane fitting step is not successful.

17. The system of claim 16 wherein in the plane-fitting algorithm:
- an image segment is dilated;
- the dilated image segment and a depth image are used to determine location relative to the stereo vision camera and collect 3D points;
- a Random Sample Consensus (RANSAC)-based algorithm is used to fit a first plane to the points;
- the fit of the first plane to the points is checked based on the number of points that are sufficiently close the first plane;
- the system fails if the first plane fit is not okay;
- the algorithm tries to fit a line to the points if the first plane fit is okay;
- the first plane is replaced by a constrained plane and plane fit is checked again;
- the final plane is the constrained plane and the system is finished plane fitting if a line can be fit to the points of the constrained plane;
- the final plane is the first plane and the system is finished plane fitting if a line cannot be fit to the points of the constrained plane.

* * * * *